US006490785B1

(12) United States Patent
Kometani

(10) Patent No.: US 6,490,785 B1
(45) Date of Patent: Dec. 10, 2002

(54) MANUFACTURING APPARATUS OF WIRE HARNESS

(75) Inventor: Toshio Kometani, Nagoya (JP)

(73) Assignees: Autonetworks Technologies, Ltd., Aichi (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/391,196

(22) Filed: Sep. 7, 1999

(30) Foreign Application Priority Data

Dec. 9, 1998 (JP) .......................................... 10-349947

(51) Int. Cl.[7] ............................................... B23P 19/00

(52) U.S. Cl. .......................... 29/742; 29/33 M; 29/593; 29/622; 29/748; 29/753; 29/850; 29/861; 29/866; 29/868; 73/9; 73/862.01; 73/865.9

(58) Field of Search ............................... 29/33 M, 748, 29/866, 868, 742, 593, 622, 850, 861, 753; 73/9, 862.01, 865.9

(56) References Cited

U.S. PATENT DOCUMENTS

| | | | | | |
|---|---|---|---|---|---|
| 3,930,524 | A | * | 1/1976 | Tarbox | 140/93 |
| 4,043,017 | A | * | 8/1977 | Folk et al. | 29/749 |
| 4,043,034 | A | | 8/1977 | Sucheski et al. | 29/749 |
| 4,375,229 | A | * | 3/1983 | Mikami | 140/102 |
| 4,669,182 | A | * | 6/1987 | Ferroni | 29/622 |
| 4,976,294 | A | * | 12/1990 | Kudo | 140/102 |
| 5,119,546 | A | * | 6/1992 | Cameron | 29/748 |
| 5,156,557 | A | * | 10/1992 | Okafuji | 439/404 |
| 5,224,251 | A | * | 7/1993 | Cameron | 29/33 |
| 5,289,633 | A | * | 3/1994 | Okafuji | 29/850 |
| 5,345,978 | A | * | 9/1994 | Okafuji | 140/92.1 |
| 5,396,053 | A | * | 3/1995 | Swartz | 235/462 |
| 5,499,443 | A | * | 3/1996 | Ota | 29/741 |
| 5,611,141 | A | * | 3/1997 | Takada et al. | 29/861 |
| 5,745,975 | A | * | 5/1998 | Heisner et al. | 29/564.6 |
| 5,774,981 | A | * | 7/1998 | Maejima | 29/861 |
| 5,774,983 | A | * | 7/1998 | Maejima | 29/881 |
| 5,791,037 | A | * | 8/1998 | Takada et al. | 29/566.3 |
| 5,913,469 | A | * | 6/1999 | Suzuki | 226/36 |
| 5,970,609 | A | * | 10/1999 | Shioda | 29/861 |
| 6,021,566 | A | * | 2/2000 | Ohta | 29/863 |
| 6,170,152 | B1 | * | 1/2001 | Ohta | 29/747 |

FOREIGN PATENT DOCUMENTS

| | | |
|---|---|---|
| EP | 0 390 080 A1 | 10/1990 |
| EP | 0 833 416 A2 | 4/1998 |
| EP | 0 833 416 A3 | 11/1999 |
| JP | 09283254 | 4/1996 |
| JP | 10-241473 | 9/1998 |

* cited by examiner

*Primary Examiner*—Peter Vo
*Assistant Examiner*—Paul D Kim
(74) *Attorney, Agent, or Firm*—Oliff & Berridge, PLC

(57) ABSTRACT

In a manufacturing apparatus of a wire harness in which pallet P, on which a plurality of connectors C are juxtaposed, is moved by a pallet feeding section 1 and a pressure-contact terminal of connector C is automatically positioned at a pressure-contact position under a pressure-contact head section 4, an electric wire "a" is automatically set at a pressure-contact terminal of connector C by an electric wire supply section 2 and an electric wire setting section 3, and cover L is automatically set on connector C by a cover mounting section 5. A type and position of the electric wire "a" to be arranged and the height of press-fitting of the electric wire into the pressure-contact terminal are controlled by a program, and the operation and state are checked by a sensor.

7 Claims, 8 Drawing Sheets

MANUFACTURING APPARATUS OF WIRE HARNESS

BACKGROUND OF THE INVENTION

The present invention relates to a manufacturing apparatus of a wire harness for automobile use.

FIG. 7 is a view showing an example of a wire harness for automobile use in which connectors are attached to both end portions of wires arranged in parallel to each other. At one end of this wire harness, which will be referred to as end A hereinafter, eight pieces of electric wires "a" are connected to one connector C. At the other end of this wire harness, which will be referred to as end B hereinafter, four pieces of electric wires "a" are respectively connected to two connectors C.

In order to enhance the working efficiency of connection, insulation displacement connection(pressure-contact connection) is applied to the means for connecting electric wire "a" to connector C as shown in FIG. 8. This insulation displacement connection is conducted as follows. Electric wire "a" is pushed downward by pressure-contact blade S and press-fitted into a groove 60 of pressure-contact terminal T provided in each connector C. When electric wire "a" is press-fitted into the groove 60, a insulation cover 62 covering a conductor bundle 61 of electric wires "a" is cut off at an end edge of the groove 60, so that the conductor bundle 61 is exposed outside. This conductor bundle 61 is contacted with pressure-contact terminal T. and at the same time, electric wires "a" are held in the groove 60 by the spring-back action of pressure-contact terminal T. After electric wires "a" have been press-fitted into pressure-contact terminal T, connector C is covered with terminal cover L as shown in FIG. 9, so that electric wires "a" can be prevented from coming off.

In this connection, Japanese Unexamined Patent Publication 10-241473 discloses an apparatus used for the above pressure-contact connection in which the pressure-contact terminals of the connector are positioned at pressing positions of the contact-pressure apparatus when the pallets, on which predetermined connectors are juxtaposed, are moved. In this apparatus, electric wires are manually supplied to the pressure-contact terminals and also the terminal cover is manually attached to the connector.

However, when the above apparatus is used, there is a possibility that the electric wires are mistakenly supplied and erroneous wiring is made. Further, it takes time to select the electric wires and attach the terminal cover. Therefore, it is impossible to improve the productivity.

SUMMARY OF THE INVENTION

The present invention is accomplished to solve the above problems. It is an object of the present invention to prevent the occurrence of erroneous electric wiring and enhance the productivity when the wire harness is manufactured.

In order to solve the above problems, the present invention provides a manufacturing apparatus of a wire harness in that: a pallet in which a plurality of connectors are juxtaposed is automatically positioned at a pressure-contact position; wiring of an electric wire in the pressure-contact terminal of the connector is automatically conducted; and a cover is automatically attached to a connector.

When a type, position and height of press-fitting of an electric wire into the pressure-contact terminal are controlled according to a program, and the operation and state are checked by sensors.

DETAILED DESCRIPTION OF THE PREFERRED EMBODIMENTS

Figure 1:
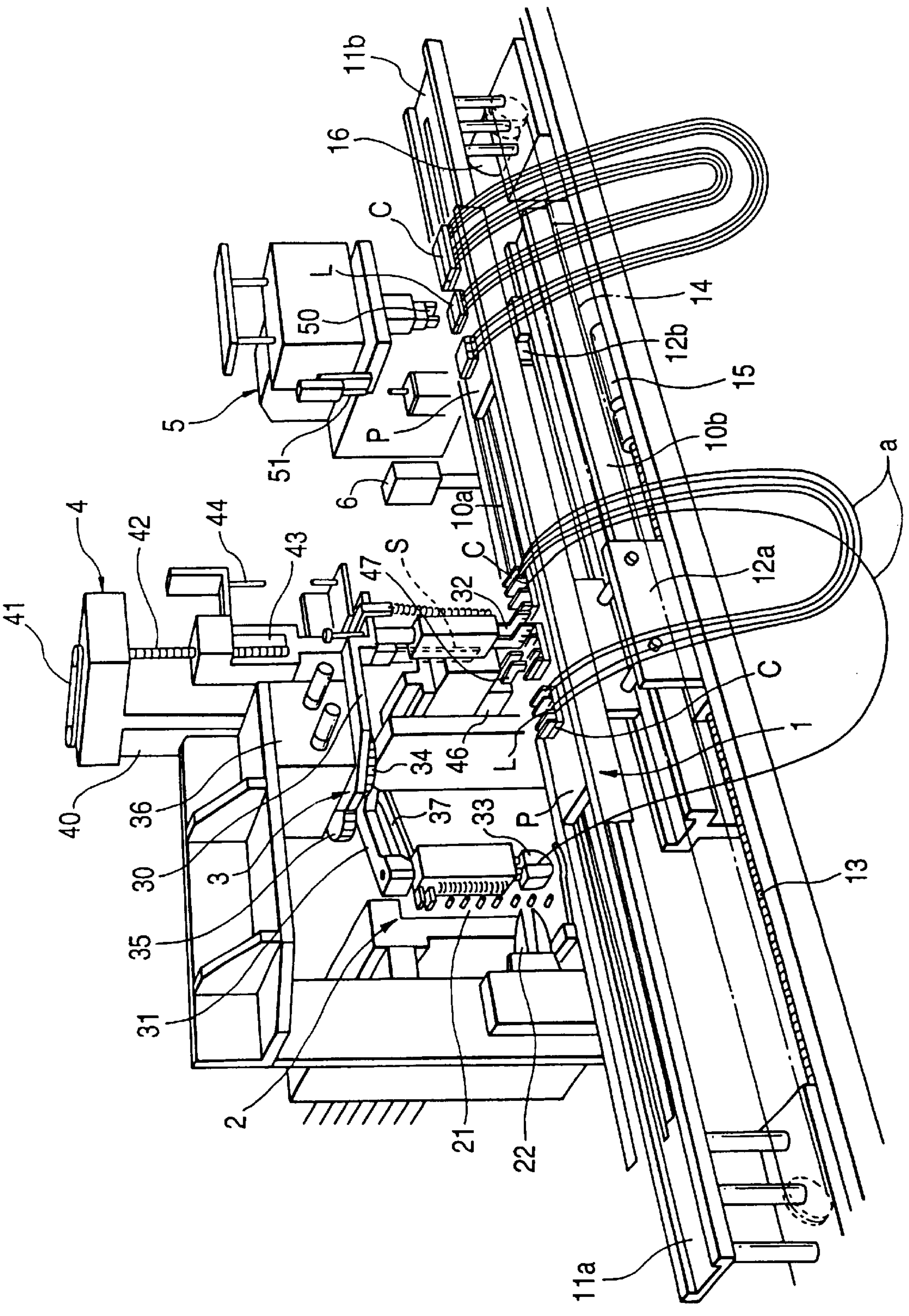
FIG. 1 is an overall perspective view showing an embodiment of the present invention.

Referring to the appended drawings, an embodiment of the present invention will be explained as follows. As shown in FIG. 1, this manufacturing apparatus of manufacturing a wire harness comprises: a pallet supply section 1, electric wire supply section 2, electric wire setting section 3, pressure-contact head section 4, and cover mount section 5.

The pallet supply section 1 includes: an upper and a lower guide rail 10*a*, 10*b* for guiding pallet P on which a plurality of connectors C are juxtaposed; two elevating mounts 11*a*, 11*b*, arranged on both sides of the guide rails 10*a*, 10*b*, for receiving and delivering pallet P between the guide rails 10*a*, 10*b*; and two carriages 12*a*, 12*b* for moving pallet P along the guide rail 10*a* or 10*b*. The carriage 12*a* is screwed to the screw shaft 13 by a ball screw structure, and the carriage 12*b* is attached to the endless belt 14 which is stretched between a pair of pulleys, and the carriages 12*a* and 12*b* are respectively driven by the servo motors 15, 16 so that they can travel along the guide rails.

Figure 2:
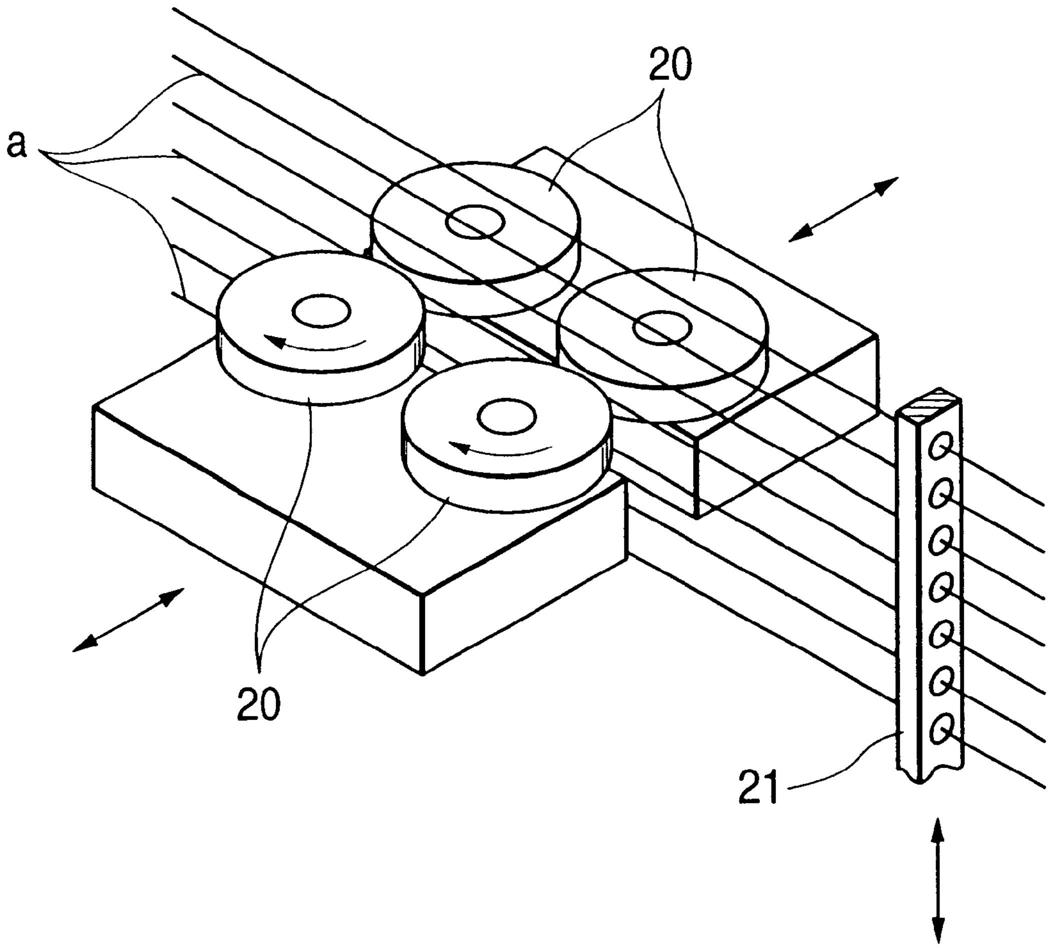
FIG. 2 is a perspective view showing an outline of an electric wire supply section of the above embodiment.

As shown in FIGS. 1 and 2, the electric wire supply section 2 includes: two pairs of rollers 20 coming into contact with each other; and an elevating body 21 for elevating a large number of electric wires "a" to be put under the condition that they are juxtaposed in the vertical direction. By the motion of the elevating body 21, electric wire "a" to be contacted with pressure in the next place is positioned at a level of the roller 20 and held by the pair of rollers 20 and fed by a predetermined length. In the front of the electric wire supply section 2, there are provided shears 22 which proceed and retract with respect to a feeding hole of the electric wire "a", and there is also provided a support bar 23 which can be freely elevated.

As shown in FIGS. 1 and 3, the electric wire setting section 3 includes two rotary arms 30, 31. At ends of the two rotary arms 30, 31, there are provided an end A chuck 32 and an end B chuck 33 which respectively hold ends A and B of the electric wire "a". Gears 34, 35 arranged at the ends of the respective rotary arms 30, 31 are meshed with each other, and the respective rotary arms 30, 31 can be simultaneously rotated in the opposite direction by the same drive motor 36.

In the process of rotation, the locus of the rotary arm 30 is different from that of the rotary arm 31. Accordingly, there is no possibility of interference of the end A chuck 32 with the end B chuck 33. In this case, a link 37, which composes a parallel crank mechanism together with the rotary arm 31, is connected to one side of the end B chuck 33. Due to the above structure, the end B chuck 33 can be directed to the same direction at all times.

Figure 4:
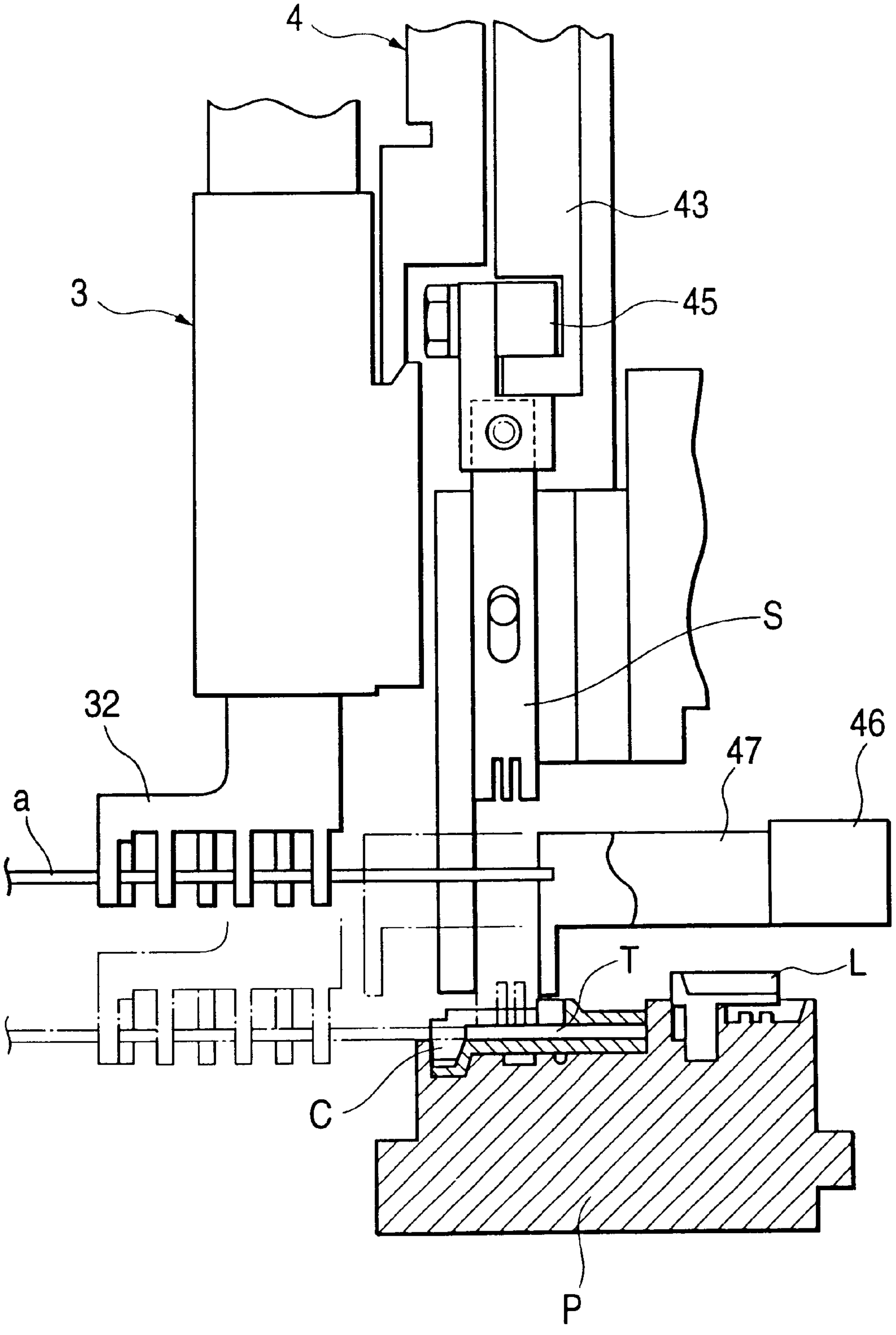
FIG. 4 is a right side view of a lower portion of a pressure-contact head section of the above embodiment.
Figure 5:
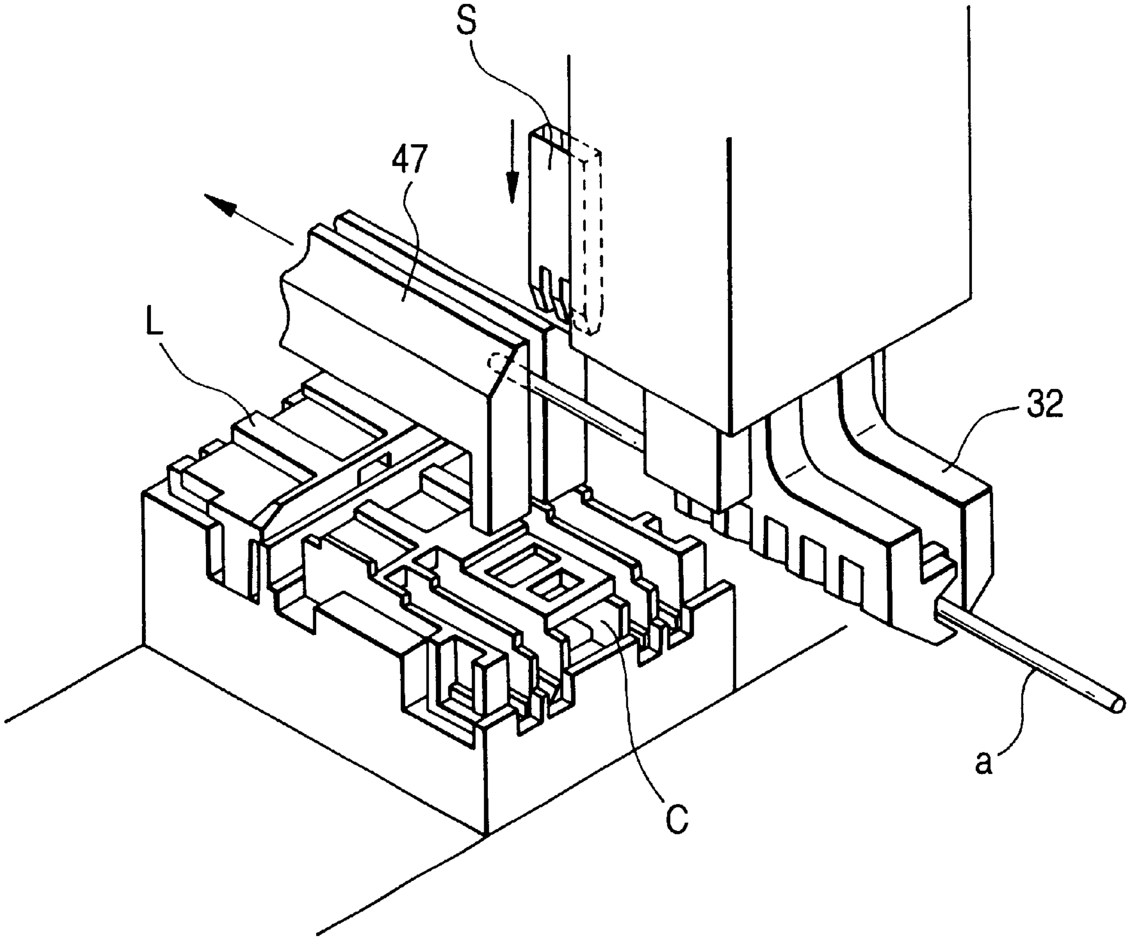
FIG. 5 is a perspective view showing an outline of the operation of a curled wire straightening chuck of the above embodiment.

The pressure-contact head section 4 is composed as follows. As shown in FIGS. 1, 4 and 5, when the servo motor 40 is driven, the screw shaft 42 is rotated via the belt 41. The elevating rod 43 is screwed to this screw shaft 42 by a ball screw mechanism. Due to the above arrangement, pressure-contact blade S arranged at a lower end of the elevating rod 43 is elevated. At the same time, when the elevating rod 43 is lowered, the end A chuck 32 or the end B chuck 33 is pushed downward. In this pressure-contact head section 4, there are provided a linear scale 44 for detecting the height of the elevating rod 43 from the reference position and a load cell 45 for detecting a reaction force of pressure-contact blade S.

At a lower position of the pressure-contact head section 4, there is provided a curled wire straightening device 46. This curled wire straightening device 46 includes: a curled wire straightening chuck 47 which is moved in the longitudinal direction while it is chucking an end portion of the electric wire "a" protruding from the end A chuck 32 or the end B chuck 33; and an opening and closing sensor not shown in the drawing.

Figure 6:
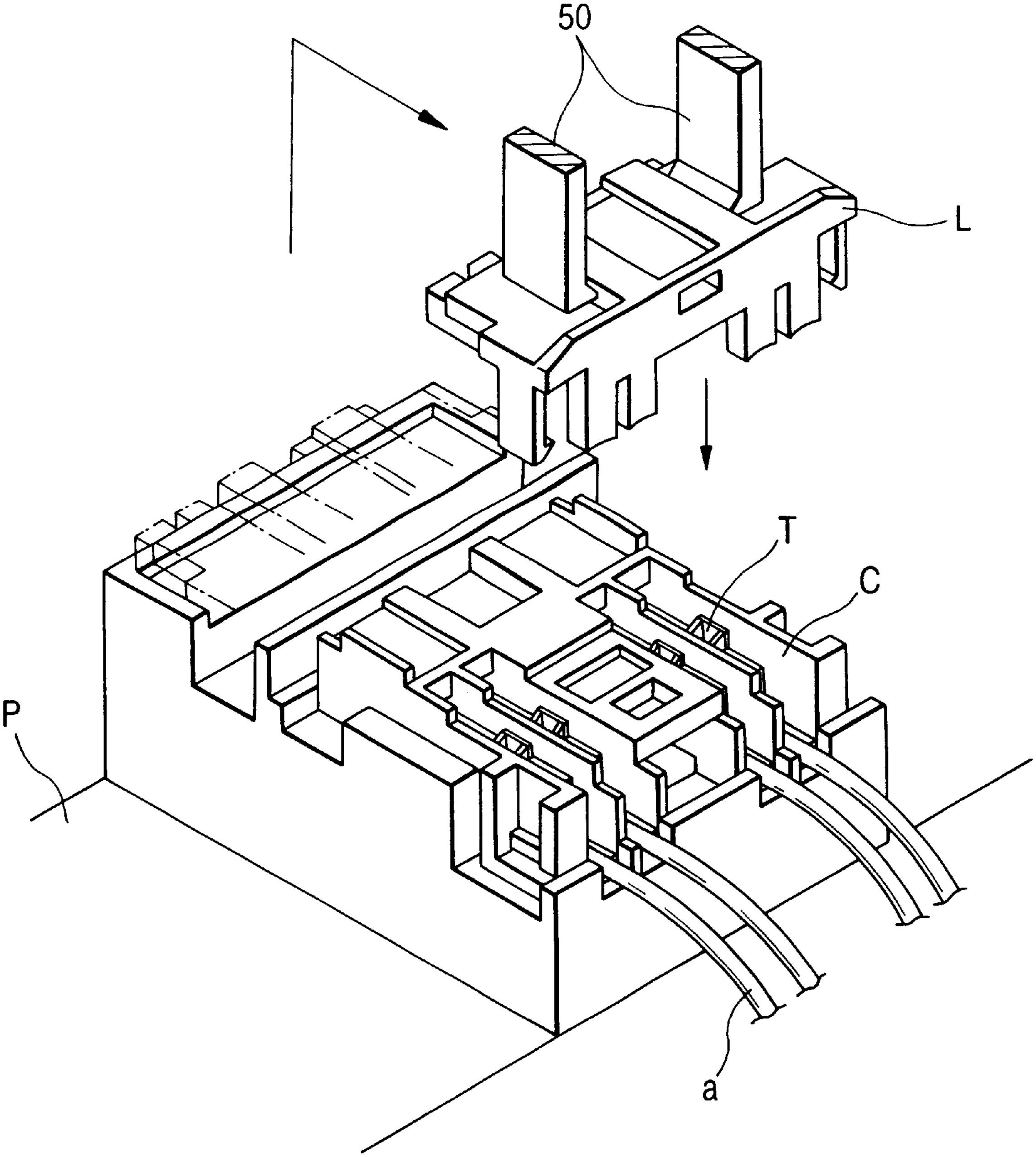
FIG. 6 is a perspective view showing an outline of the operation of a cover mounting section of the above embodiment.

As shown in FIGS. 1 and 6, the cover mounting section 5 includes a cover holding chuck 50 which is vertically elevated and moved in the longitudinal direction when it is driven by a cylinder. This cover mounting section 5 includes a linear scale 51 for detecting the height of the cover holding chuck 50 from a reference position.

Figure 7:
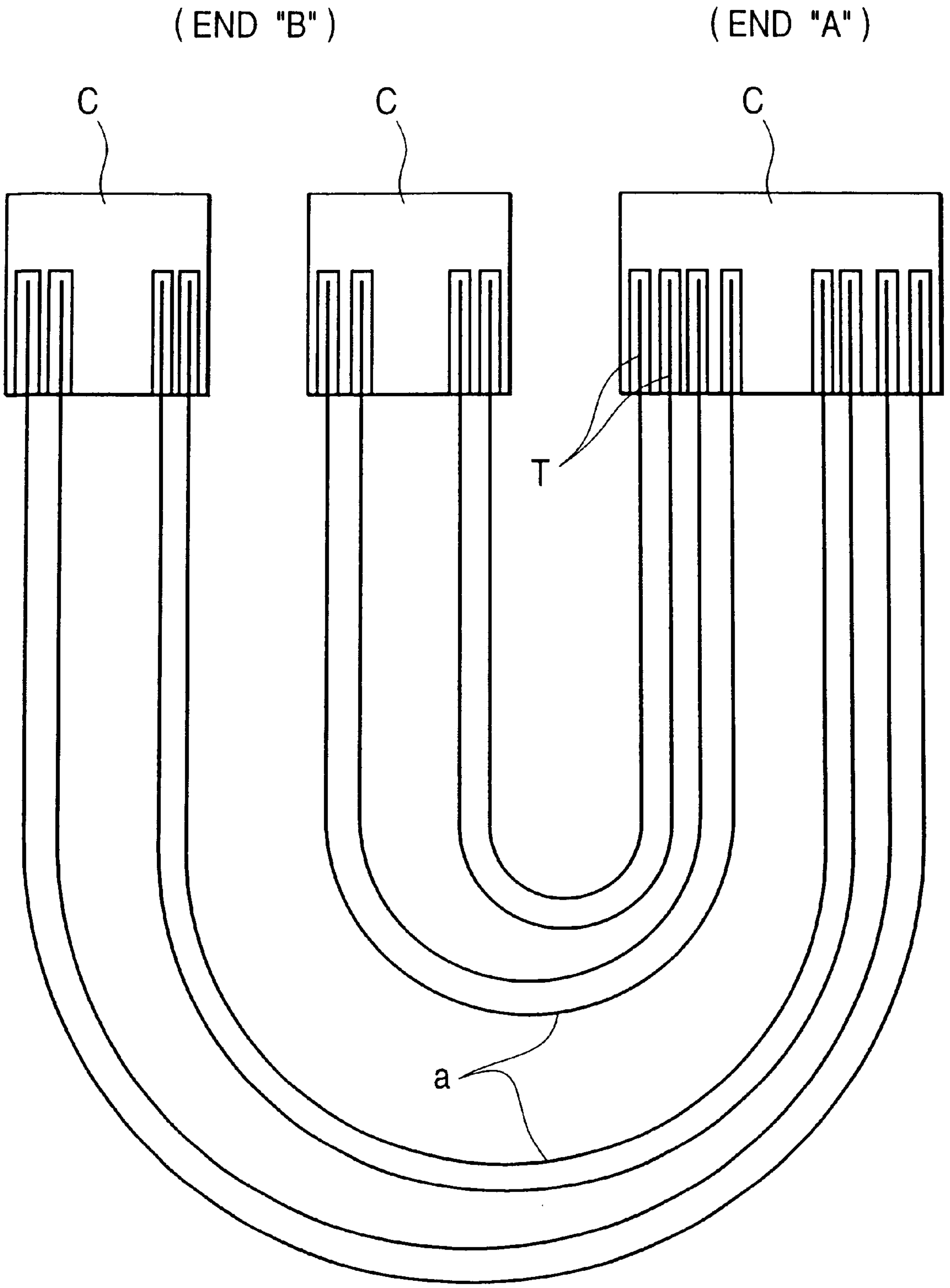
FIG. 7 PRIOR ART
FIG. 7 is a plan view showing an example of wire harness.
Figure 8:
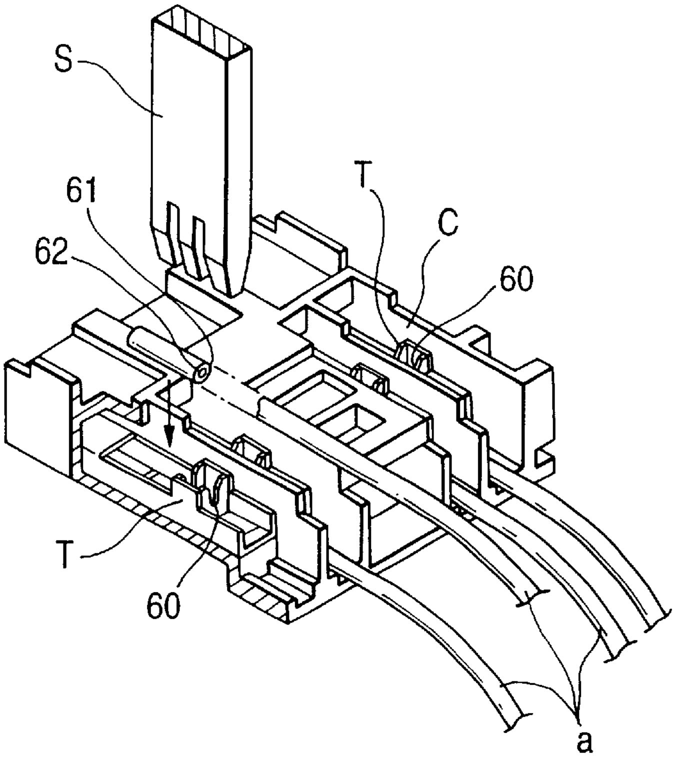
FIG. 8 PRIOR ART
FIG. 8 is a perspective view showing pressure-contact of an electric wire with a connector terminal.
Figure 9:
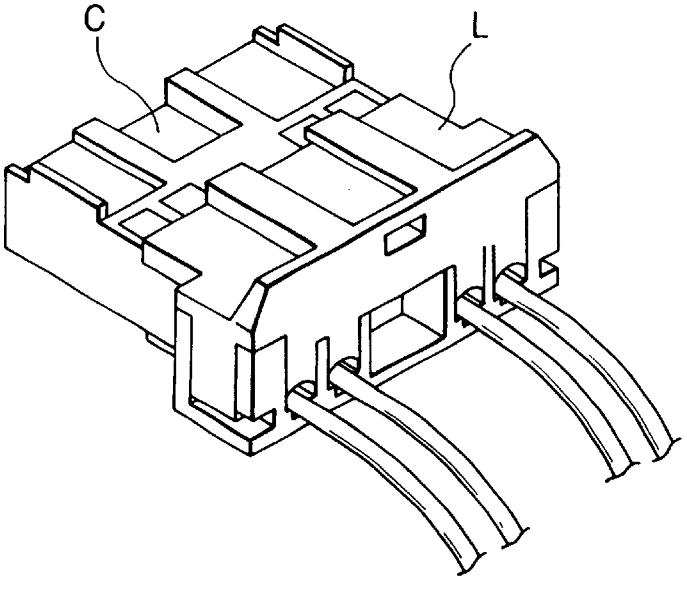
FIG. 9 PRIOR ART
FIG. 9 is a perspective view showing a connector to which a terminal cover is attached.

For example, when the wire harness shown in FIG. 7 is manufactured by the above manufacturing apparatus of the wire harness, three connectors C corresponding to ends A and B of the wire harness and terminal cover L juxtaposed on pallet P on the elevating mount 11*b* located at the rising position, and the elevating mount 11*b* is lowered, and this pallet P is sent onto the elevating mount 11*a*, which is at a lowering position, via the guide rail 10*b* when the carriage 12*b* travels.

Then, the engagement of the carriage 12*b* with a pallet P is released, and the elevating mount 11*a* is raised and the carriage 12*a* is engaged with pallet P. According to the travel of the carriage 12*a*, pallet P is moved onto the guide rail 10*a*. In this way, terminal T of connector C with which the electric wire "a" is pressure-contacted for the first time is positioned under pressure-contact blade S of the pressure-contact head section 4. This positioning is conducted according to a program which is previously set.

Figure 3A:
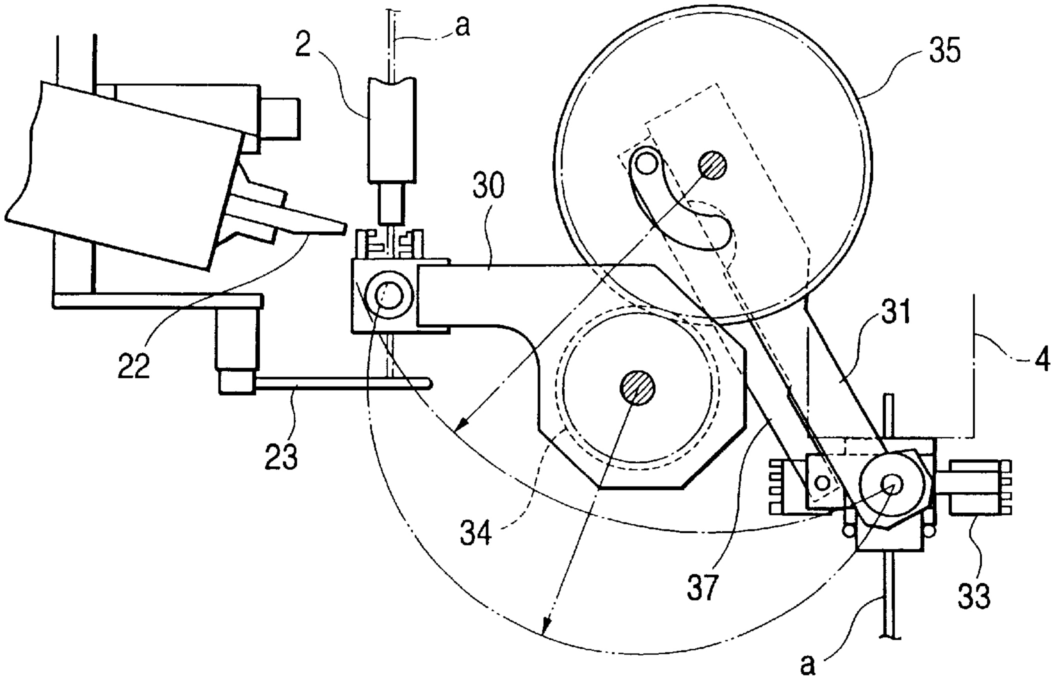
FIG. 3A is a plan view showing a state of an electric wire setting section of the above embodiment.
Figure 3B:
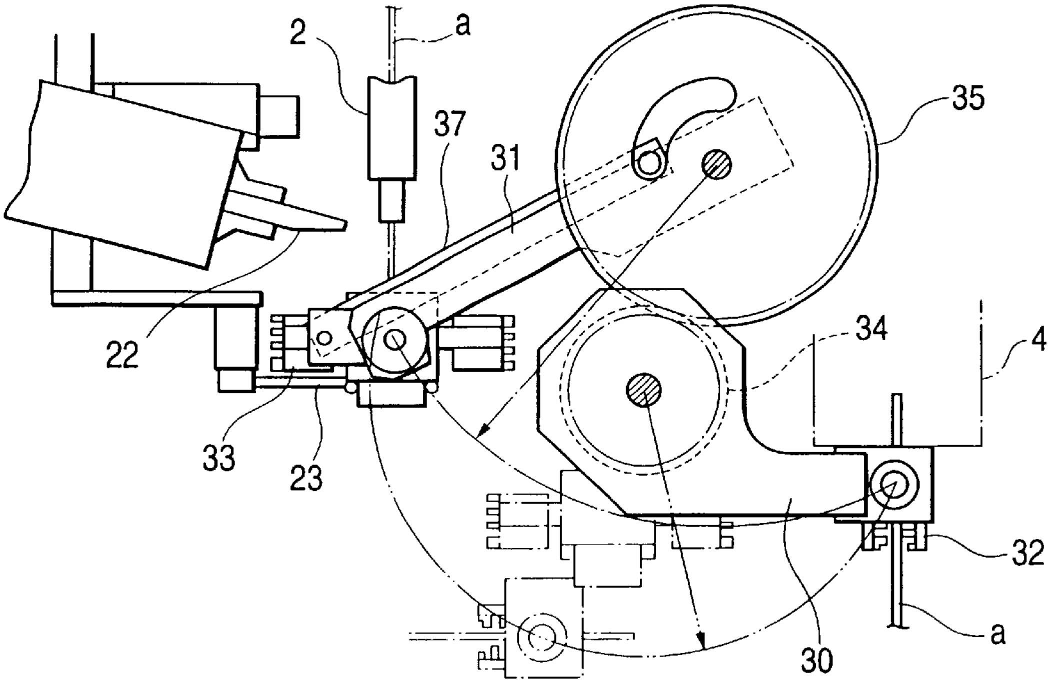
FIG. 3B is a plan view showing another state of an electric wire setting section of the above embodiment.

Next, the first electric wire "a", which has been previously set according to the program, is a little fed out from the electric wire supply section 2, and its forward end portion is held by the end A chuck 32 as shown in FIG. 3A. While the electric wire "a" is further being fed out, the rotary arm 30 is rotated, and the end A chuck 32 is positioned in the front of the pressure-contact head section 4 of the end A chuck 32 as shown in FIG. 3B.

Feeding of the electric wire "a" is stopped, and a forward end portion of the electric wire "a" protruding from the end A chuck 32 is held by the curled wire straightening chuck 46 as shown in FIGS. 4 and 5, and this chuck 46 is retracted while it is slid on the cover of the electric wire "a" in the drawing direction. In this way, the curled electric wire "a" can be straightened.

At this time, whether or not the curled wire straightening chuck 46 holds the electric wire "a" is detected by the opening and closing sensor. Due to the above detection, whether or not the electric wire "a" is sufficiently protruded is judged by the program.

Successively, pressure-contact blade S of the pressure-contact head section 4 is lowered together with the end A chuck 32, and an end portion of the electric wire "a" is press-fitted into the groove of terminal T of predetermined connector C. The height of press-fitting is previously set at the most appropriate value by the control program of the servo motor 40. This height of press-fitting is measured by the linear scale 44, and the resistance of-press-fitting is measured by the load cell 45. Then, a state of press-fitting is judged by the program.

In parallel with this pressure-contact connection, while the electric wire "a", which stops in front of the electric wire supply section 2, is being held by the support bar 23, it is held by the end B chuck 33, and the shears 22 are moved forward, so that the electric wire "a"is cut by a predetermined length at the rear of the end B chuck 33 as shown in FIG. 3B.

After end A has been connected by pressure-contact, the rotary arm 31 is rotated and the end B chuck 33 is positioned in front of the pressure-contact head 4, and the electric wire "a" is released from the end A chuck 32. Then, the rotary arm 30 is rotated in the opposite direction simultaneously with the rotary arm 31, so that the end A chuck 32 is positioned in front of the electric wire supply section 2 as shown in FIG. 3A. When pallet P is moved according to the setting of the program, terminal T of connector C of this electric wire "a" is positioned under pressure-contact blade S of the pressure-contact head section 4.

Next, when pressure-contact blade S of the pressure-contact head section 4 is lowered together with the end B chuck 33, a rear end portion of the electric wire "a" is press-fitted into a groove of terminal T of a predetermined connector C at end B. In the same manner as that on the side of end A, the height of press-fitting is previously set at the most appropriate value by the control program of the servo motor 40. When the press-fitting is. conducted, the height of press-fitting is measured by the linear scale 44, and the resistance of press-fitting is measured by the load cell 45 so as to judge the state of press-fitting by the program.

While end B is being connected by pressure-contact, the electric wire supply section 2 feeds the electric wire "a" to be successively connected by pressure-contact. When the above pressure-contact connecting motion is repeatedly conducted on all electric wires "a", wiring shown in FIG. 7 is completed.

After that, the engagement of pallet P with the carriage 12*a* is released. Instead of that, the carriage 12*b* is engaged with pallet P, and this pallet P is moved to a position under the cover mounting section 5.

As shown in FIG. 6, terminal cover L is held by the holding chuck 50 and lifted up and moved forward. Then, terminal cover L is put on connector cover C. This operation is successively conducted on each connector C. In this way, the wire harness is completed.

When terminal cover L is attached as described above, the height of terminal cover L from connector C is measured by the linear scale 51 and compared with an "a" owed value by the program so that an attaching state of terminal cover L is judged. According to the result of judgment, only pieces of good wire harness are delivered as products.

In this connection, after the electric wire "a" has been press-fitted and before terminal cover L is attached, the height of press-fitting of the electric wire "a" is measured by a laser sensor 6 (FIG. 1) and cover L is put on only connector C in which the heights of press-fitting of all electric wires "a" are in the allowance. Due to the foregoing, it is possible to save labor necessary for removing terminal cover L when a defective product is repaired.

According to the present invention, in a manufacturing apparatus of a wire harness in which a pallet, on which predetermined connectors are juxtaposed, is moved and automatically y positioned at a pressure-contact connecting position, wiring is automatically conducted on electric wires connected to pressure-contact terminals of the connector. Therefore, it is possible to prevent the occurrence of defective products which are made by erroneous wiring. Accordingly, the wire harness of stable quality can be effectively manufactured.

When types and positions of the electric wires to be arranged are arbitrarily selected in the above automatic wiring, it is easy to change the types and positions of the electric wires, so that various types of products can be effectively produced.

When the height of press-fitting of the electric wire into the pressure-contact terminal is arbitrarily set by the control program of the motor for press-fitting, it is possible to set the height of press-fitting at the most appropriate value at which the pressure-contact condition can be stabilized.

When the height of press-fitting is measured by the linear scale and the resistance of press-fitting is measured by the load cell so as to automatically y judge the press-fitting condition of the wire, it is possible to prevent the occurrence of defective products.

When the height of press-fitting is measured by the laser beam sensor after press-fitting of the electric wire and the terminal cover is set only on the connector in which the heights of press-fitting of all electric wires are in the allowance, it becomes unnecessary to remove the terminal cover when a defective product is repaired, that is, the defective product can be easily repaired.

When the height of the terminal cover is measured by the linear scale in the case of attaching the terminal cover to the connector so as to automatically y judge the cover attaching condition, it is possible to prevent the occurrence of a defective product in which the terminal cover is defectively attached to the connector.

What is claimed is:

1. A manufacturing apparatus of a wire harness comprising:

a pallet guide portion that automatically guides a pallet on which a plurality of connectors are juxtaposed;

an electric wire supply portion which automatically feeds an electric wire by a predetermined length;

an electric wire setting portion which automatically sets the electric wire on a pressure-contact terminal of one of said connectors;

a press contact portion which automatically press-fits said electric wire into the pressure-contact terminal of one of said connectors; and a cover mounting portion which automatically sets a terminal cover on said one of said connectors, wherein a height of press-fitting is measured by a linear scale and resistance of press-fitting is measured by a load cell when the electric wire is press-fitted into the pressure-contact terminal, and a state of press-fitting of the electric wire is automatically judged.

2. A manufacturing apparatus of a wire harness according to claim 1, wherein a type and position of said electric wire to be set are arbitrarily selected according to a program when the electric wire is automatically set, and the electric wire is arranged one by one.

3. A manufacturing apparatus of a wire harness according to claim 1, wherein the height of press-fitting of the electric wire is arbitrarily set according to a control program of a motor used for press-fitting when the electric wire is press-fitted into the pressure-contact terminal.

4. A manufacturing apparatus of a wire harness according to claim 1, wherein a height of the terminal cover is measured by a linear scale when the terminal cover is set on the connector on the pallet, and a state of the cover is automatically judged.

5. A manufacturing apparatus of a wire harness according to claim 1, wherein said pallet guide portion comprises:

an upper guide rail and a lower guide rail, each guide rail separately guiding the pallet on which the plurality of said connectors are juxtaposed;

two elevating mounts arranged at opposite ends of said guide rails the elevating mounts transferring said pallet between said upper and lower guide rails; and two carriages that move said pallet, each carriage moving said pallet along a respective one of the guide rails.

6. A manufacturing apparatus of a wire harness according to claim 1, wherein said press contact portion includes:

an electric wire supply section that supplies said electric wire;

an electric wire setting section that sets said electric wire on said pressure-contact terminal of said connector; and a pressure contact head section that presses the electric wire into said pressure-contact terminal.

7. A manufacturing apparatus of a wire harness comprising a pallet guide portion that automatically y guides a pallet on which a plurality of connectors are juxtaposed;

an electric wire supply portion which automatically feeds an electric wire by a predetermined length;

an electric wire setting portion which automatically sets the electric wire on a pressure-contact terminal of one of said connectors;

a press contact portion which automatically press-fits said electric wire into the pressure-contact terminal of one of said connectors; and a cover mounting portion which automatically sets a terminal cover on said one of said connectors, wherein a height of press-fitting of the electric wire is measured by a laser beam sensor after the electric wire has been set and press-fitted into the connector on the pallet, and said terminal cover is set on only the connector in which the heights of press-fitting of all electric wires are within an allowable range.

* * * * *